United States Patent [19]

Taya et al.

[11] Patent Number: 4,663,563

[45] Date of Patent: May 5, 1987

[54] HALOPHOSPHATE PHOSPHOR AND FLUORESCENT LAMP USING THE SAME

[75] Inventors: Akira Taya, Kawasaki; Kazuo Narita, Tokyo; Yasuhiko Hagiwara, Nogi; Keiji Hatakeyama, Yokohama, all of Japan

[73] Assignee: Kabushiki Kaisha Toshiba, Kawasaki, Japan

[21] Appl. No.: 855,629

[22] Filed: Apr. 25, 1986

[30] Foreign Application Priority Data

Aug. 30, 1985 [JP] Japan .................. 60-189808

[51] Int. Cl.$^4$ ................ C09K 11/477; H01J 61/44
[52] U.S. Cl. ................ 313/487; 252/301.4 P; 252/301.4 H
[58] Field of Search ............ 252/301.4 P, 301.6 P, 252/301.4 H; 313/486, 487

[56] References Cited

U.S. PATENT DOCUMENTS

| | | | |
|---|---|---|---|
| 2,726,214 | 12/1955 | Ranby et al. | 252/301.4 P |
| 3,488,292 | 1/1970 | McAllister | 252/301.4 P |
| 3,509,065 | 4/1970 | Palilla | 252/301.4 P |
| 4,500,443 | 2/1985 | Taya et al. | 252/301.4 P |
| 4,527,087 | 7/1985 | Taya et al. | 313/487 |

FOREIGN PATENT DOCUMENTS

| | | | |
|---|---|---|---|
| 74585 | 3/1983 | European Pat. Off. | 252/301.4 P |
| 59-121766 | 7/1984 | Japan | 313/487 |
| 1498796 | 1/1978 | United Kingdom | 252/301.4 P |
| 1522363 | 8/1978 | United Kingdom | 252/301.4 P |

*Primary Examiner*—Jack Cooper

*Attorney, Agent, or Firm*—Schwartz, Jeffery, Schwaab, Mack, Blumenthal & Evans

[57] ABSTRACT

Disclosed is a halophosphate phosphor activated with divalent europium, which is represented by the formula:

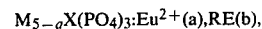

$M_{5-a}X(PO_4)_3:Eu^{2+}(a),RE(b)$, wherein M represents three alkaline earth metals consisting of barium, calcium and magnesium; X represents at least one of fluorine, chlorine and bromine; RE represents at least one of rare earth elements selected from the group consisting of ytterbium, neodymium, samarium, dysprosium, holmium and thulium; and a and b each represent a positive number of less than 5.

Disclosed is also a fluorescent lamp which comprises a glass tube and a mixture of a halophosphate phosphor activated with divalent europium represented by the above formula and a strontium-magnesium orthophosphate phosphor activated with tin represented by the formula: $(Sr,Mg)_3(PO_4)_2:Sn$, the mixture being coated on inside wall of the glass tube.

The halophosphate phosphor of this invention can decrease to a greater extent the afterglow as compared with those known in the prior art, without loss of the luminescence intensity. The fluorescent lamp of this invention has large initial luminous flux and luminous flux-maintaining efficient, color rendering at 4,200 to 5,600 K classified into the EDL type, afterglow time being shortened to the level at which any problem does not arise in practical use.

5 Claims, 2 Drawing Figures

HALOPHOSPHATE PHOSPHOR AND FLUORESCENT LAMP USING THE SAME

BACKGROUND OF THE INVENTION

This invention relates to a halophosphate phosphor having novel composition and a fluorescent lamp using the same. More particularly, it relates to a halophosphate phosphor being capable of emitting a stable blue-green light with high emission efficiency and having a less afterglow after the excitation has been removed, and a fluorescent lamp using the same, especially a high color rendering fluorescent lamp whose emitted color temperature is 4,200 to 5,600 K (Kelvin) and color rendering classification belongs to the so-called EDL type corresponding to AAA type according to Japanese Industrial Standard Z9112-1983.

Halophosphate phosphors activated with divalent europium emit blue-green light as disclosed in U.S. Pat. No. 4,500,443. These phosphors are known to emit a stable light with high efficiency and be useful for, particularly, preparation of a blue-green phosphor for the above-mentioned EDL type high color rendering fluorescent lamp. However, the halophosphate phosphors activated with divalent europium may generate an afterglow (a phenomenon in which luminescence remains after the excitation has been removed) depending on the mixing proportions between alkaline earth metals such as barium, calcium and magnesium contained therein.

When the fluorescent lamps are prepared by use of such phosphors which may readily generate the afterglow, no serious inconveniences will arise when they are used at ordinary places and forms. However, in special places such as a darkroom in a color photograph processing laboratory, the afterglow which remains immediately after the lamp has been put out may give bad influences to photosensitive papers or films.

SUMMARY OF THE INVENTION

An object of this invention is to provide a halophosphate phosphor activated with divalent europium and having novel composition, which can reduce the afterglow to a level that may not cause any obstacles in practical uses. Another object of this invention is to provide a high color rendering fluorescent lamp with high efficiency, employing said phosphor as a blue-green light emitting component.

The present inventors have made intensive studies on the composition of the halophosphate phosphor disclosed in the above-mentioned U.S. Pat. No. 4,500,443 in order to achieve the above object, and consequently found the fact that the afterglow can be decreased to a greater extent by adding small amount of specific rare earth elements mentioned hereinbelow to the halophosphate phosphor, and thus have invented the phosphor of this invention and also a fluorescent lamp using the same. That is, the halophoshate phosphor activated with divalent europium of this invention is characterized by being represented by the formula:

$M_{5-a}X(PO_4)_3:Eu^{2+}(a),RE(b)$, wherein M represents three alkaline earth metals consisting of barium, calcium and magnesium; X represents at least one of fluorine, chlorine and bromine; RE represents at least one of rare earth elements selected from the group consisting of ytterbium, neodymium, samarium, dysprosium, holmium and thulium; and a and b each represent a positive number of less than 5.

Also, the fluorescent lamp of this invention comprises a mixture of said halophosphate phosphor activated with $Eu^{2+}$ and a strontium-magnesium orthophosphate phosphor activated with tin represented by the formula: $(Sr,Mg)_3(PO_4)_2:Sn$; said mixture is coated inside wall of a glass tube.

DESCRIPTION OF THE PREFERRED EMBODIMENTS

Figure 1:
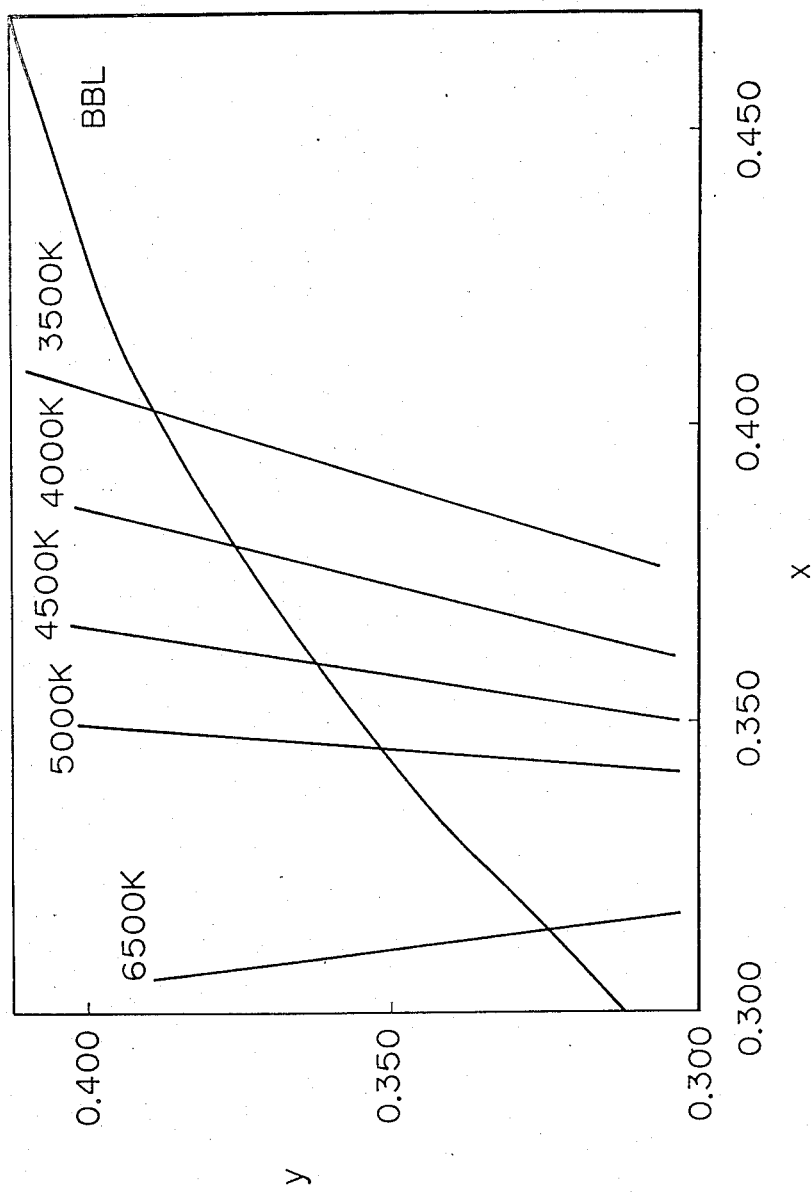
FIG. 1 shows a chromaticity diagram of the present fluorescent lamp.

In the above formula of this invention, RE may be any one or more of the above-mentioned Yb, Nd, Sm, Dy, Ho and Tm.

Also, the value a indicates a gram-atom value of divalent europium and is so determined as to satisfy the inequality of $0.01 < a \leq 0.2$, preferably $0.03 \leq a \leq 0.1$. When the value is not more than 0.01, sufficient emission luminescence intensity can not be obtained. While, even if the $Eu^{2+}$ is incorporated so as to exceed 0.2, the emission luminescence intensity of blue-green light is saturated to waste the expensive $Eu^{2+}$ ineconomically.

The value b indicates a gram-atom value of RE incorporated and ranges generally between $1 \times 10^{-4}$ and $5 \times 10^{-2}$, preferably between $1 \times 10^{-3}$ and $3 \times 10^{-2}$. When the value b is less than $1 \times 10^{-4}$, no effect of decrease in afterglow of the phosphor is observed. On the contrary, at a level more than $5 \times 10^{-2}$, luminescence intensity of the phosphor is lowered.

M represents three alkaline earth metals of Ba, Ca and Mg. Taking into consideration the use as the phosphor for blue-green light emitting components of a fluorescent lamp, in order to set its emission peak in the wavelength range of 480 to 500 nm, M preferably contains 3.0 to 4.5 gram-atom of Ba, 0.5 to 2.0 gram-atom of Ca and 0.01 to 1.0 gram-atom of Mg.

Also, X represents one, or a mixture of two or more, of F, Cl and Br. Particularly, it is preferable that X is a single component constituted of only Cl, for the purpose of achieving high emission efficiency and less deterioration.

The phosphor of this invention may be prepared in the following manner. Namely, predetermined amounts of various compounds such as oxides, phosphates, carbonates and ammonium salts that may form Ba, Ca, Mg, P, F, Cl, Br Eu and RE when they are fired are weighed. The starting mixture obtained is throughly pulverized and mixed, for example, in a ball mill. The resultant mixture is then placed in an alumina or quartz crucible and fired in air for 1 to 5 hours at 800° to 1200° C. The fired product obtained is allowed to cool, pulverized and sieved, and then again fired at 800° to 1,200° C. in a slightly reducing atmosphere of, for example, a mixture of hydrogen and nitrogen for 2 to 3 hours. The twice fired product is allowed to cool, and is then pulverized, sieved, washed, filtered, dried and again sieved to give the phophor of this invention.

Then, the phosphor prepared in the above-mentioned manner is mixed with a strontium-magnesium orthophosphate phosphor activated with tin represented by the formula: $(Sr,Mg)_3(PO_4)_2:Sn$ and the resultant phosphor is coated inside wall of a glass tube in a conventional manner to readily prepare the fluorescent lamp of this invention.

Here, it is effective in view of the high color rendering to combine a first phosphor or the halophosphate phosphor activated with $Eu^{2+}$ having its emission peak within the wavelength of 480 to 500 nm, and the second phosphor or the phosphor represented by the formula: $(Sr,Mg)_3(PO_4)_2:Sn$ having its emission peak within the wavelength of 620 to 640 nm and the half width of 120 to 160 nm.

The mixing ratio of the halophosphate phosphor of this invention to the second phosphor varies depending on the luminescence intensity of these phosphors, particle sizes thereof, etc., but, in general, it ranges from 50:50 to 55:45 in a weight ratio.

merated in Table 1 in correspondence to composition formula thereof.

The relative luminescence intensity represents the value of luminescence intensity of each specimen excited by 254 nm ultraviolet irradiation, relative to the luminescence intensity designated as 100 which is obtained when the specimen of Comparative example is excited in the same manner. The value is an index to show the intensity of luminance.

The afterglow time indicates the time (second) until the luminescence intensity of the phosphor is decreased to $1/10^5$ after the irradiation has been ceased, relative to the luminescence intensity assumed as 1.0, which is obtained when the phosphor is excited by 254 nm ultraviolet irradiation.

TABLE 1

|   | Compositional formula of the phosphor | Emission peak wavelength (nm) | relative luminescence intensity | afterglow time (sec.) |
|---|---|---|---|---|
| Example 1 | $Ba_{3.95}Ca_{0.8}Mg_{0.2}(PO_4)_3Cl:Eu^{2+}(0.05),Yb(1 \times 10^{-2})$ | 485 | 95 | 5 |
| Example 2 | $Ba_{3.90}Ca_{0.8}Mg_{0.2}(PO_4)_3Cl:Eu^{2+}(0.1),Yb(1 \times 10^{-2})$ | 487 | 103 | 7 |
| Example 3 | $Ba_{3.85}Ca_{0.8}Mg_{0.2}(PO_4)_3Cl:Eu^{2+}(0.15),Yb(1 \times 10^{-2})$ | 488 | 107 | 8 |
| Example 4 | $Ba_{3.75}Ca_{0.8}Mg_{0.4}(PO_4)_3Cl:Eu^{2+}(0.05),Yb(1 \times 10^{-2})$ | 486 | 97 | 15 |
| Example 5 | $Ba_{4.15}Ca_{0.6}Mg_{0.2}(PO_4)_3Cl:Eu^{2+}(0.05),Yb(1 \times 10^{-2})$ | 480 | 90 | 10 |
| Example 6 | $Ba_{3.75}Ca_{1.0}Mg_{0.2}(PO_4)_3Cl:Eu^{2+}(0.05),Yb(1 \times 10^{-2})$ | 490 | 105 | 11 |
| Example 7 | $Ba_{3.95}Ca_{0.8}Mg_{0.2}(PO_4)_3Cl:Eu^{2+}(0.05),Yb(1 \times 10^{-2})$ | 485 | 100 | 23 |
| Example 8 | $Ba_{3.95}Ca_{0.8}Mg_{0.2}(PO_4)_3Cl:Eu^{2+}(0.05),Yb(5 \times 10^{-2})$ | 485 | 97 | 14 |
| Example 9 | $Ba_{3.92}Ca_{0.8}Mg_{0.2}(PO_4)_3Cl:Eu^{2+}(0.05),Yb(3 \times 10^{-2})$ | 485 | 92 | 0.05 |
| Example 10 | $Ba_{3.90}Ca_{0.8}Mg_{0.2}(PO_4)_3Cl:Eu^{2+}(0.05),Yb(5 \times 10^{-2})$ | 485 | 85 | 0.02 |
| Example 11 | $Ba_{3.95}Ca_{0.8}Mg_{0.2}(PO_4)_3Cl:Eu^{2+}(0.05),Nd(1 \times 10^{-2})$ | 485 | 89 | 12 |
| Example 12 | $Ba_{3.95}Ca_{0.8}Mg_{0.2}(PO_4)_3Cl:Eu^{2+}(0.05),Sm(1 \times 10^{-2})$ | 485 | 92 | 8 |
| Example 13 | $Ba_{3.95}Ca_{0.8}Mg_{0.2}(PO_4)_3Cl:Eu^{2+}(0.05),Dy(1 \times 10^{-2})$ | 485 | 93 | 14 |
| Example 14 | $Ba_{3.95}Ca_{0.8}Mg_{0.2}(PO_4)_3Cl:Eu^{2+}(0.05),Ho(1 \times 10^{-2})$ | 485 | 91 | 16 |
| Example 15 | $Ba_{3.95}Ca_{0.8}Mg_{0.2}(PO_4)_3Cl:Eu^{2+}(0.05),Tm(1 \times 10^{-2})$ | 485 | 92 | 11 |
| Comparative example | $Ba_{3.95}Ca_{0.8}Mg_{0.2}(PO_4)_3Cl:Eu^{2+}(0.05)$ | 485 | 100 | 176 |

This invention will be described in detail in reference to examples but should not be limited by these examples.

EXAMPLES 1 to 15

Each material powders were weighed so as to give the composition indicated in Table 1 and admixed. Then the mixture was pulverized and blended in a ball mill for 2 hours. The resultant mixture was sieved and placed in a quartz crucible and fired in air at 950° C. for 3 hours.

The fired product was allowed to cool, pulverized, sieved and then fired again in the mixture gas composition of 2% of hydrogen and 98% of nitrogen at 950° C. for 1 hour.

The twice fired product was allowed to cool, pulverized, sieved, washed, filtrated, dried and sieved again to give the various phosphor specimens.

For comparison, a phosphor containing no rare earth element was also prepared in the same manner as in the above examples to show as a comparative example.

The specimens thus obtained were tested for emission peak wavelength, half width, relative luminescence intensity and afterglow time. The results are also enu- Then, to the samples of Examples 1, 9 and 10 and Comparative example, phosphors of $(Sr,Mg)_3(PO_4)_2:Sn$ having the emission peak wavelength of 630 nm and half width of 140 nm were added so that the resultant mixtures may show a color temperature of 5,600 K and a deviation of $\oplus 0.05$ uv, relatively. The resultant mixtures were respectively coated on inside walls of glass tubes for fluorescent lamps each having a tube diameter of 25 mm and a tube length of 345 mm to prepare four fluorescent lamps of 10 W according to the conventional manner.

Thus obtained four lamps were tested for colorimetry, photometry and afterglow time. Results are shown in Table 2.

Here, the afterglow time indicates the time (second) until the luminescence intensity of the phosphor is decreased to $1/10^6$ after the lamp has been put out, relative to the luminescene intensity assumed as 1.0 which is obtained when the lamp is put on.

Figure 2:
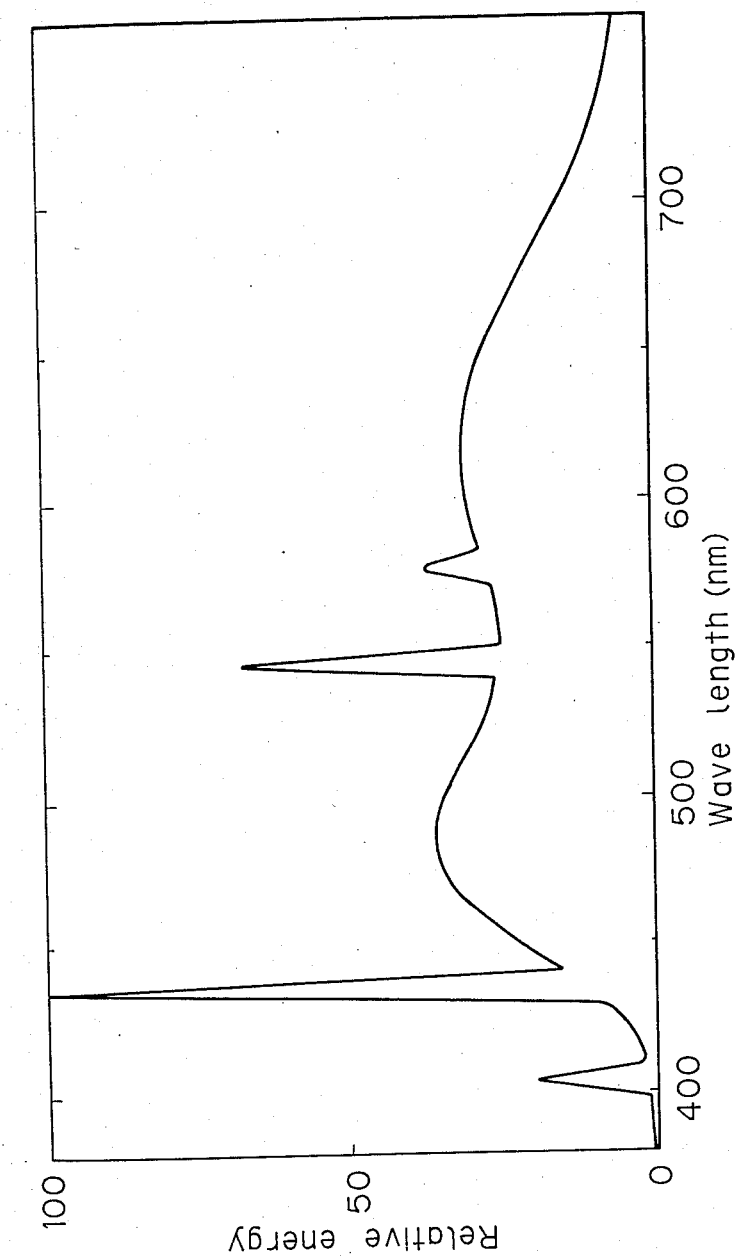
FIG. 2 shows a spectral energy distribution diagram.

Chrometicities of the respective lamps are indicated in FIG. 1 and diagram of the spectral energy distribution thereof are shown in FIG. 2.

TABLE 2

|  | Mixed ratio (% by weight) | | Characteristics of lamps | | | | |
|---|---|---|---|---|---|---|---|
|  | Halophosphate phosphor of this invention | $(Sr,Mg)_3(PO_4)_2:Sn$ | Whole luminous flux (Lm) | Color temperature (K) | Deviation (uv) | Average color rendering evaluation coefficient (Ra) | Afterglow time (sec) |
| Lamp of Example 1 | 51 | 49 | 381 | 5,600 | +0.005 | 99 | 5 |
| Lamp of | 51 | 49 | 376 | 5,600 | +0.005 | 99 | 0.1 |

TABLE 2-continued

| | Mixed ratio (% by weight) | | Characteristics of lamps | | | | |
|---|---|---|---|---|---|---|---|
| | Halophosphate phosphor of this invention | $(Sr,Mg)_3(PO_4)_2$:Sn | Whole luminous flux (Lm) | Color temperature (K) | Deviation (uv) | Average color rendering evaluation coefficient (Ra) | Afterglow time (sec) |
| Example 9 Lamp of Example 10 | 51 | 49 | 365 | 5,600 | +0.005 | 99 | 0.1 |
| Lamp of Comp. | 51 | 49 | 380 | 5,600 | +0.005 | 99 | 75 |

As is apparent from the above description, the halophosphate phosphor of this invention can decrease to a greater extent the afterglow as compared with those known in the prior art, without loss of the luminescence intensity when the ultraviolet rays of 254 nm were irradiated. The fluorescent lamp prepared by combining the phosphor of this invention and the phosphor of $(Sr,Mg)_3(PO_4)_2$:Sn has large initial luminous flux and luminous flux-maintaining efficient, color rendering at 4,200 to 5,600 K classified into the EDL type (corresponding to the AAA type according to JIS Z9112-1983), afterglow time being shortened to the level at which any problem does not arise in practical use and no limitation when it is used. Thus, it is useful as high color rendering fluorescent lamp.

We claim:

1. A halophosphate phosphor activated with divalent europium, which is represented by the formula:

$$M_{5-a}X(PO_4)_3:Eu^{2+}(a),RE(b),$$

wherein M represents three alkaline earth metals consisting of barium, calcium and magnesium in amounts of 3.0 to 4.5 gram-atom, 0.5 to 2.0 gram-atom and 0.01 to 1.0 gram-atom, respectively; X represents at least one of fluorine, chlorine and bromine; RE represents at least one of rare earth elements selected from the group consisting of ytterbium, neodymium, samarium, dysprosium, holmium and thulium; and a and b each represent a number satisfying the inequality of $0.01 < a \leq 0.2$ and $1 \times 10^{-4} \leq b \leq 5 \times 10^{-2}$, respectively, and exhibiting a smaller afterglow than said phosphor absent RE.

2. The halophosphate phosphor according to claim 1, wherein X is Cl.

3. A fluorescent lamp which comprises a glass tube and a mixture of a halophosphate phosphor activated with divalent europium represented by the formula:

$$M_{5-a}X(PO_4)_3:Eu^{2+}(a),RE(b),$$

wherein M represents three alkaline earth metals consisting of barium, calcium and magnesium in amounts of 3.0 to 4.5 gram-atom, 0.5 to 2.0 gram-atom and 0.01 to 1.0 gram-atom, respectively; X represents at least one of fluorine chlorine and bromine, RE represents at least one of rare earth elements selected from the group consisting of ytterbium, neodymium, samarium, dysprosium, holmium and thulium; and b and b each represent a number satisfying the inequality of $0.01 < a \leq 0.2$ and $1 \times 10^{-4} \leq b \leq 5 \times 10^{-2}$, respectively, and exhibiting a smaller afterflow than said phosphor absent RE and a strontium-magnesium orthophosphate phosphor activated with tin represented by the formula: $(Sr,Mg)_3(PO_4)_2$:Sn, said mixture being coated on inside wall of the glass tube.

4. The fluorescent lamp according to claim 3, wherein said halophosphate phosphor has the emission peak in the wavelength region of 480 to 500 nm and said strontium-magnesium orthophosphate phosphor has the emission peak in the wavelength region of 620 to 640 nm and the half width of 120 to 160 nm.

5. The fluorescent lamp according to claim 2, wherein the proportional ratio of said halophosphate phosphor and said strontium-magnesium orthophosphate phosphor ranges between 50:50 and 55:45 by weight ratio.

* * * * *